US012562889B2

(12) United States Patent　　　(10) Patent No.:　US 12,562,889 B2
Todd et al.　　　(45) Date of Patent:　Feb. 24, 2026

(54) GLOBAL TOPICS IN A DISTRIBUTED LEDGER TO SHARE TRUST PROVIDER INFORMATION

(71) Applicant: Dell Products L.P., Round Rock, TX (US)

(72) Inventors: Stephen J. Todd, North Andover, MA (US); Trevor Scott Conn, Leander, TX (US); Ahmed Khalid, Cork (IE); Mustafa Al-Bado, Cork (IE)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 18/362,716

(22) Filed: Jul. 31, 2023

(65) Prior Publication Data

US 2025/0047475 A1　　Feb. 6, 2025

(51) Int. Cl.
H04L 9/08 (2006.01)
H04L 9/00 (2022.01)
H04L 9/32 (2006.01)

(52) U.S. Cl.
CPC ............ H04L 9/083 (2013.01); H04L 9/3297 (2013.01); H04L 9/50 (2022.05)

(58) Field of Classification Search
CPC .......... H04L 9/083; H04L 9/3297; H04L 9/50
USPC ....................................................... 713/168
See application file for complete search history.

(56) References Cited

U.S. PATENT DOCUMENTS

| | | | |
|---|---|---|---|
| 7,302,641 B1 * | 11/2007 | Yajima | G06F 9/45512 |
| | | | 704/251 |
| 9,330,389 B2 | 5/2016 | Pitroda et al. | |
| 10,135,607 B1 | 11/2018 | Roets | |
| 10,438,290 B1 | 10/2019 | Winklevoss et al. | |
| 10,581,805 B2 | 3/2020 | Simons et al. | |
| 10,601,665 B2 | 3/2020 | Bathen et al. | |
| 10,871,948 B1 | 12/2020 | Dowling | |
| 10,915,891 B1 | 2/2021 | Winklevoss et al. | |

(Continued)

FOREIGN PATENT DOCUMENTS

| | | |
|---|---|---|
| WO | 2018/126077 A1 | 7/2018 |
| WO | 2019/210409 A1 | 11/2019 |

(Continued)

OTHER PUBLICATIONS

Murphy et al, Towards trust-based data weighting in machine learning, 2023 IEEE 31st International Conference on Network Protocols (ICNP), pp. 1-6 (Oct. 2023) (Year: 2023).*

(Continued)

*Primary Examiner* — David P Zarka
(74) *Attorney, Agent, or Firm* — Workman Nydegger

(57) ABSTRACT

A distributed ledger is configured with a global topic whose identifier is publicized and well known. The global topic stores information about trust providers including topic identifiers and smart contract identifiers. Requestors can query the global topic to retrieve the information of specific trust providers. Once the information of the specific trust providers is known, the requestors can publish or write annotations and transactions to the distributed ledger. By associating the entries in the global topic with timestamps, requestors can reconfigure themselves automatically with updated trust provider information whenever a write to the distributed ledger fails.

18 Claims, 7 Drawing Sheets

(56) References Cited

U.S. PATENT DOCUMENTS

| | | | |
|---|---|---|---|
| 11,108,891 B1* | 8/2021 | Todd | H04L 67/1044 |
| 11,153,280 B1 | 10/2021 | Walwadkar | |
| 11,188,977 B2 | 11/2021 | Youb et al. | |
| 11,200,569 B1 | 12/2021 | James et al. | |
| 11,308,487 B1 | 4/2022 | Foster et al. | |
| 11,334,883 B1 | 5/2022 | Auerbach et al. | |
| 11,533,381 B1 | 12/2022 | Hockey | |
| 11,562,333 B1 | 1/2023 | James et al. | |
| 11,716,312 B1 | 8/2023 | Mcnamara, Jr. | |
| 11,792,084 B1 | 10/2023 | Foukas et al. | |
| 11,961,070 B2 | 4/2024 | Sarin | |
| 11,971,862 B1* | 4/2024 | Han | G06Q 20/401 |
| 11,978,044 B2 | 5/2024 | Basu et al. | |
| 12,008,561 B2 | 6/2024 | Cona et al. | |
| 12,032,696 B2 | 7/2024 | Todd | |
| 12,045,879 B2 | 7/2024 | Rapowitz et al. | |
| 12,118,613 B2 | 10/2024 | Foote et al. | |
| 12,141,871 B1 | 11/2024 | James et al. | |
| 2009/0024660 A1* | 1/2009 | Borgsmidt | G06F 16/283 |
| 2009/0028135 A1 | 1/2009 | Mantripragada et al. | |
| 2009/0144313 A1* | 6/2009 | Hodge | G06F 40/169 |
| | | | 707/999.102 |
| 2010/0082771 A1 | 4/2010 | Wood et al. | |
| 2010/0153835 A1* | 6/2010 | Xiong | G06F 40/169 |
| | | | 715/230 |
| 2011/0296510 A1 | 12/2011 | Hatlelid et al. | |
| 2015/0379510 A1 | 12/2015 | Smith | |
| 2016/0117668 A1 | 4/2016 | Pitroda et al. | |
| 2017/0132620 A1 | 5/2017 | Miller et al. | |
| 2018/0101906 A1 | 4/2018 | Mcdonald et al. | |
| 2018/0218343 A1 | 8/2018 | Kolb et al. | |
| 2018/0276626 A1 | 9/2018 | Laiben | |
| 2018/0287800 A1 | 10/2018 | Chapman et al. | |
| 2018/0329693 A1 | 11/2018 | Eksten et al. | |
| 2019/0019251 A1 | 1/2019 | Phillips, IV | |
| 2019/0116158 A1 | 4/2019 | Patil et al. | |
| 2019/0238316 A1 | 8/2019 | Padmanabhan | |
| 2019/0260803 A1 | 8/2019 | Bykampadi et al. | |
| 2019/0303942 A1 | 10/2019 | Balaraman et al. | |
| 2019/0347406 A1 | 11/2019 | Lev-Ran | |
| 2019/0385153 A1 | 12/2019 | Cui et al. | |
| 2019/0385154 A1 | 12/2019 | Cui et al. | |
| 2019/0386969 A1 | 12/2019 | Verzun et al. | |
| 2020/0007312 A1 | 1/2020 | Vouk et al. | |
| 2020/0027089 A1 | 1/2020 | Kuchar et al. | |
| 2020/0104819 A1 | 4/2020 | Garcia | |
| 2020/0112443 A1 | 4/2020 | Todd | |
| 2020/0120023 A1 | 4/2020 | Munson et al. | |
| 2020/0133955 A1 | 4/2020 | Padmanabhan et al. | |
| 2020/0236102 A1 | 7/2020 | Azulay et al. | |
| 2020/0313856 A1 | 10/2020 | Basu et al. | |
| 2020/0344233 A1 | 10/2020 | Lai et al. | |
| 2021/0027404 A1 | 1/2021 | De Bold | |
| 2021/0082044 A1 | 3/2021 | Sliwka et al. | |
| 2021/0112117 A1 | 4/2021 | Munson et al. | |
| 2021/0124727 A1* | 4/2021 | Todd | G06F 16/2237 |
| 2021/0124728 A1* | 4/2021 | Todd | G06F 16/2365 |
| 2021/0126794 A1 | 4/2021 | Forrester et al. | |
| 2021/0164794 A1 | 6/2021 | Nagpal et al. | |
| 2021/0192520 A1 | 6/2021 | Patel et al. | |
| 2021/0243167 A1 | 8/2021 | Todd et al. | |
| 2021/0243218 A1* | 8/2021 | Todd | H04L 9/50 |
| 2021/0304065 A1* | 9/2021 | Todd | G06N 5/02 |
| 2021/0328886 A1 | 10/2021 | Guim et al. | |
| 2021/0342803 A1 | 11/2021 | Yoo | |
| 2021/0365445 A1 | 11/2021 | Robell et al. | |
| 2021/0366586 A1 | 11/2021 | Ryan et al. | |
| 2021/0374730 A1 | 12/2021 | Todd et al. | |
| 2021/0385216 A1 | 12/2021 | Khalil et al. | |
| 2021/0405983 A1* | 12/2021 | Todd | G06F 21/64 |
| 2021/0409436 A1* | 12/2021 | Todd | H04L 63/1416 |
| 2022/0021711 A1 | 1/2022 | Marsh et al. | |
| 2022/0038289 A1 | 2/2022 | Huang | |
| 2022/0084015 A1 | 3/2022 | Fawzy et al. | |
| 2022/0100879 A1 | 3/2022 | Todd et al. | |
| 2022/0116445 A1 | 4/2022 | Filippou et al. | |
| 2022/0129555 A1 | 4/2022 | Todd | |
| 2022/0138325 A1 | 5/2022 | Todd et al. | |
| 2022/0188800 A1 | 6/2022 | Sells et al. | |
| 2022/0210061 A1 | 6/2022 | Simu et al. | |
| 2022/0253842 A1 | 8/2022 | James et al. | |
| 2022/0261882 A1 | 8/2022 | Youb et al. | |
| 2022/0272127 A1 | 8/2022 | Yawalkar et al. | |
| 2022/0294690 A1 | 9/2022 | Nolan et al. | |
| 2022/0327529 A1 | 10/2022 | Williams et al. | |
| 2022/0351232 A1 | 11/2022 | Chan et al. | |
| 2023/0114684 A1 | 4/2023 | Jakobsson et al. | |
| 2023/0155984 A1 | 5/2023 | Adam et al. | |
| 2023/0173395 A1 | 6/2023 | Cella et al. | |
| 2023/0196318 A1 | 6/2023 | Rosen et al. | |
| 2023/0230091 A1 | 7/2023 | Vaughn | |
| 2023/0237403 A1 | 7/2023 | Reineke et al. | |
| 2023/0237499 A1 | 7/2023 | Padmanabhan | |
| 2023/0334492 A1 | 10/2023 | Tai et al. | |
| 2023/0351393 A1 | 11/2023 | Cella et al. | |
| 2023/0362015 A1* | 11/2023 | Kayaba | H04L 9/3239 |
| 2024/0046318 A1 | 2/2024 | Muriqi | |
| 2024/0106839 A1 | 3/2024 | Smith et al. | |
| 2024/0152889 A1 | 5/2024 | Todd et al. | |
| 2024/0152911 A1 | 5/2024 | Rezaiean-Asel et al. | |
| 2024/0249277 A1 | 7/2024 | Hwang | |
| 2024/0256691 A1 | 8/2024 | Hwang | |
| 2024/0281799 A1 | 8/2024 | Ryan | |
| 2024/0289776 A1 | 8/2024 | Bimolaksono et al. | |
| 2024/0354735 A1 | 10/2024 | Kell et al. | |
| 2024/0354747 A1 | 10/2024 | Belostock et al. | |
| 2024/0364521 A1 | 10/2024 | Tang | |
| 2025/0088376 A1 | 3/2025 | Ren et al. | |

FOREIGN PATENT DOCUMENTS

| | | |
|---|---|---|
| WO | 2020/124317 A1 | 6/2020 |
| WO | 2021/173716 A1 | 9/2021 |

OTHER PUBLICATIONS

Ahmed G. Gad et al. "Emerging Trends in Blockchain Technology and Applications: A Review and Outlook." (Oct. 2022). Retrieved online Apr. 2, 2025. https://www.sciencedirect.com/science/article/pii/S1319157822000891 (Year: 2022).

Choudhury et al. "Impact of Distributed Ledger Technology in Global Capital Markets." (May 16, 2023) Retrieved online Apr. 2, 2025. https://www.gfma.org/wp-content/uploads/2023/05/impact-of-dlt-on-global-capital-markets-full-report.pdf (Year: 2023).

John Kolb. "A Languge-Based Approach to Smart Contract Engineering." (Dec. 18, 2020). Retrieved online Apr. 2, 2025. https://www2.eecs.berkeley.edu/Pubs/TechRpts/2020/EECS-2020-220.pdf (Year: 2020).

* cited by examiner

Query a Global Topic to Obtain
Trust Provider Information
602

600

Configure the Application/
Client/Sidecar using the Trust
Provider Information
604

Read Annotations in Provider
Topic
606

Determine Confidence Score
608

Use Data Based on the
Confidence Score
610

GLOBAL TOPICS IN A DISTRIBUTED LEDGER TO SHARE TRUST PROVIDER INFORMATION

FIELD OF THE INVENTION

Embodiments of the present invention generally relate to data confidence fabric networks and data delivery in data confidence fabric networks. More particularly, at least some embodiments of the invention relate to systems, hardware, software, computer-readable media, and methods for distributing topics and identifiers in distributed ledgers to applications or users.

BACKGROUND

Computing and other electronic devices come in a variety of types and form factors and have varying capabilities. Many of these devices generate data that may be used by various applications. Many applications generate data that is used by other applications as well. There is often a question, however, about the value of the data or the confidence that an application can place in the data. In other words, applications benefit from using data in which there is high confidence. Applications that execute using data associated with high confidence levels typically generate more reliable results and outputs.

A data confidence fabric may be configured to provide trust services or functions to data. This allows data to be associated with a confidence score, which allows applications or users to gauge the trustworthiness of the data. One of the issues facing data confidence fabrics relates to distributing identifiers to the applications and clients and other users that intend to use the data confidence fabric.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
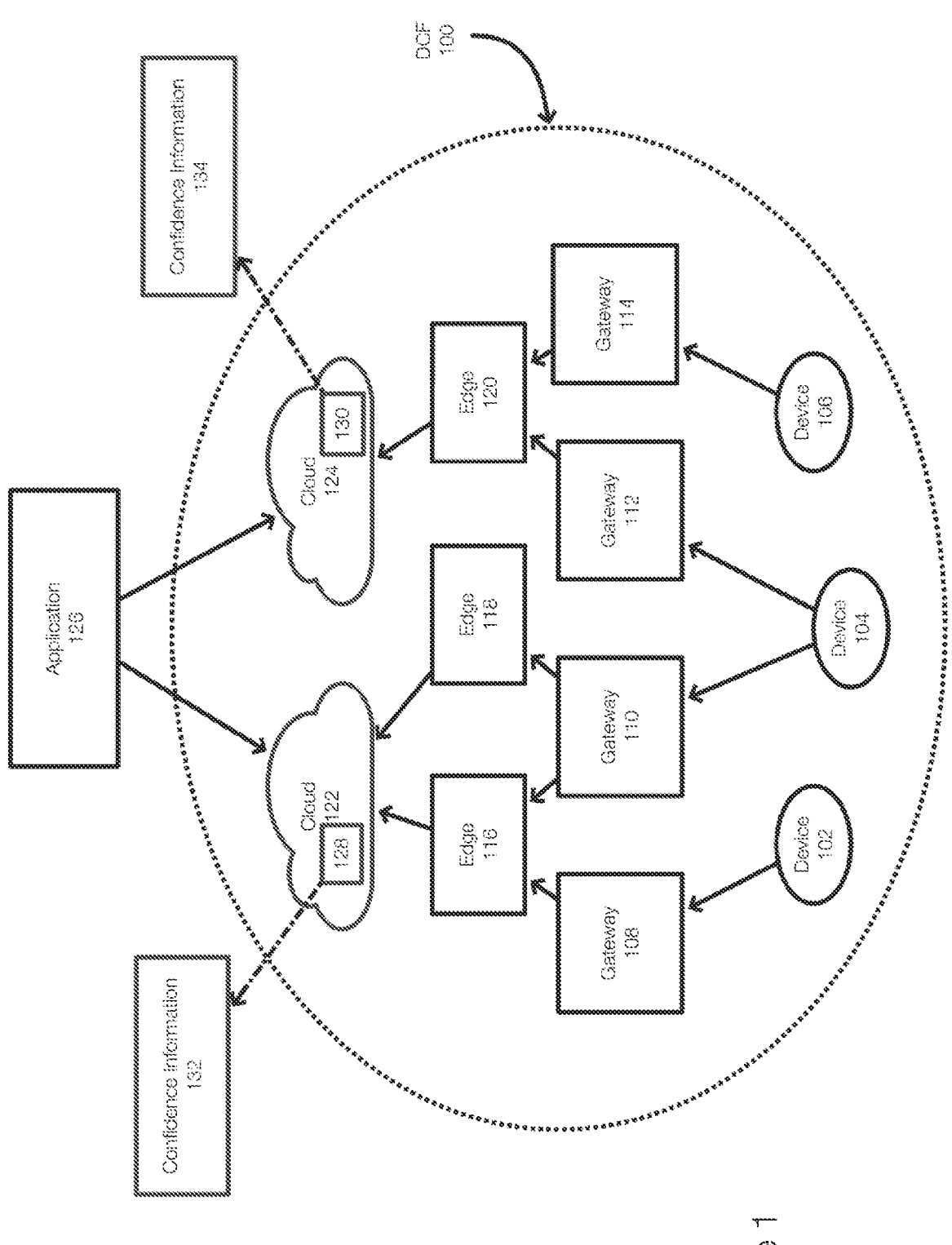
FIG. 1 discloses aspects of a computing system such as a data confidence fabric network.

Embodiments of the present invention generally relate to computing systems or ecosystems such as data confidence fabrics (DCFs). In one example, a DCF is a system or network of hardware (e.g., computers, servers, routers, network interface cards, storage including immutable storage and/or other hardware) that is provisioned (e.g., with software, services) to score or rank data that may be ingested into and/or transmitted through the DCF. Communications in a DCF may include wired (e.g., ethernet) and/or wireless communications. The data ingested into the DCF can be made available to applications, which may also be part of the DCF. The applications can leverage the confidence scores of the data. Data ingested or processed by a DCF may be generated by an application, a device, a data source, or the like. Embodiments of the invention may work in conjunction with devices or systems that are DCF enabled and/or are not DCF enabled.

In some example embodiments, applications or other data sources may generate and/or share data with other applications or users. Trust in this data can be improved by joining or using a DCF that is configured to perform trust functions to or on the data. These trust functions (e.g., trust insertion technologies) may be provided by various providers and may be hardware based and/or software based.

A DCF may include an interface system. Applications may access the interface system using, for example, an API (Application Programming Interface). A DCF is generally configured to add or associate annotations to data. The annotations include confidence information, which can take various forms including a confidence score, trust information, and/or associated trust metadata. The annotations can be added from a hardware perspective and/or a software perspective.

A DCF, by way of example only, may be an architecture and set of services that allow data to be ingested and used by applications. The DCF may include or be associated with trust insertion technologies (hardware and/or software) that are applied to the data as the data flows through the DCF. Each time a trust insertion technology is applied, an annotation may be made in a ledger or other structure and the confidence score of the data may be changed. Thus, the confidence score of data provides a view into the trustworthiness of the data to an application. Data may be associated with an overall confidence score. In addition, a confidence score may be generated for each trust insertion technology. This allows an application, for example, to evaluate how to trust the data in the context of a specific trust insertion technology.

A DCF may include various interconnected hardware environments (e.g., nodes). These nodes may have varying hardware/software capabilities that are examples of trust insertion technologies or hardware-assisted trust insertion technologies. The hardware is configured, such that as data flows from data sources to storage or to applications in a DCF system, scores or confidence information or other annotations can be attached to or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The annotations, which may include confidence information, a confidence score and/or rank, is made available to one or more applications or other clients or users. The confidence information may include, in addition to a confidence score and/or rank, tables, audit information, and the like. When the nodes are containers, the containers may be associated with a sidecar configured to perform DCF related operations on behalf of the node container.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

For example, an application operating in a nuclear facility may need to use data that are very trustworthy (have a high confidence score) while data that are used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof while data used to control lights may not require these trust services or functions. The trust functions required or desired by an application can be specified by an application, client, or user, and the DCF may perform these trust functions when available.

When a DCF is operating, various DCF operations may be performed. One of the operations includes writing or publishing annotations to a distributed ledger. Embodiments of the invention create topics in the distributed ledger and annotations are written to the various topics. For example, each trust provider may be associated with a provider topic. Some of the trust providers may require that annotations and transactions be written to the distributed ledger using a smart contract. This may allow the trust providers to charge customers for using their trust functions or trust insertion technologies. These transactions can be reflected in a billing ledger or in the provider topic.

Embodiments of the invention relate to providing applications with access to the topics in the distributed ledger. Stated differently, embodiments of the invention relate to distributing the topics (or the topic identifiers (IDS)) to the applications, clients, or users that need to connect to the DCF and perform DCF related operations.

In one example, a list of trust providers is written or stored in a global topic that is publicly accessible and that has a universal identifier known by all entities. Using the universal (e.g., for this distributed ledger) Applications may query the global topic to obtain the identifier or identifiers associated with a specific trust provider. When an application obtains the identifier(s) for a specific trust provider from the global topic, those identifiers can be used to perform DCF operations and publish to a specific provider topic. For example, annotations and transactions can be written to one or more specific provider topics.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add annotations (e.g., confidence information) to the data. After flowing through the DCF 100, the data 128 (which may have been generated by one of the devices 102, 104, and/or 106) is stored in the cloud 122 and made available to an application 126. Similarly, the data 130 may be made available to the application 126. Alternatively, the data 128 and 130 are delivered directly to the application 126. The data 128 is associated with confidence information 132 and the data 130 is associated with confidence information 134. The confidence information 132 and 134 may include confidence scores, provenance data, audit trails, data graphs, applied trust insertion technologies or trust functions, or the like. Data flowing through a DCF is typically more valuable and useful at least because the confidence scores or ranks of DCF annotated data allow an application to decide how to trust and/or use the associated data.

Figure 2:
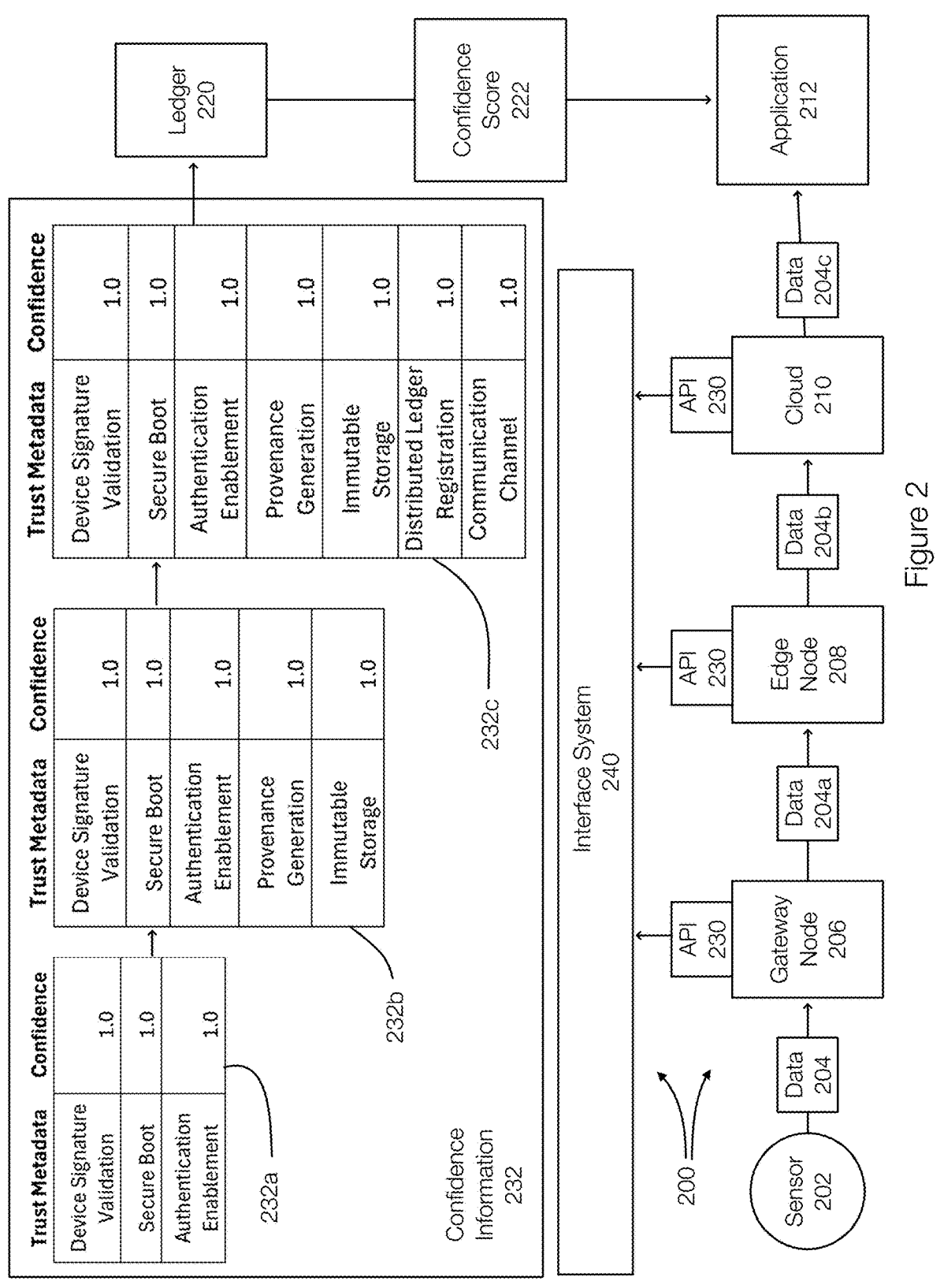
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies the data 204 as the data 204 is routed in the DCF 200. At the gateway node 206, for example, the data 204 is annotated with confidence information 232a, which relates to trust insertion technologies such as a device signature validation, a secure boot, and an authentication enablement. Each of these trust insertion technologies, in this example, are performed and add a score that is reflected in the confidence information 232a. More specifically, the gateway node 206 may access an interface system 240 using an application programming interface (API) 230, which is an example of a DCF driver, to record the confidence information 232a. The data 204 and the annotations or confidence information may be transmitted together or maintained separately. Further, data may transmitted to a target via the DCF or by the application that generated the data.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add apply additional trust insertion technologies such as provenance generation and immutable storage. These trust insertion technologies allow the confidence information to be augmented as illustrated by the confidence information 232b. Thus, the data 204b leaving the edge node 208 is associated with the confidence information 232b.

Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the annotations or confidence information 232c and with a confidence score of, in this example, 7.0. In this example, the confidence information 232c includes confidence information related to the communication channel and the associated score of 1.0 may reflect that the selection, performance, and operation of a selected communication channel was as expected and used to deliver the data 204c. The application 212 thus has insight into the trustworthiness of the data 204 generated at the sensor 202 and has insight into the communication channel.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

Figure 3:
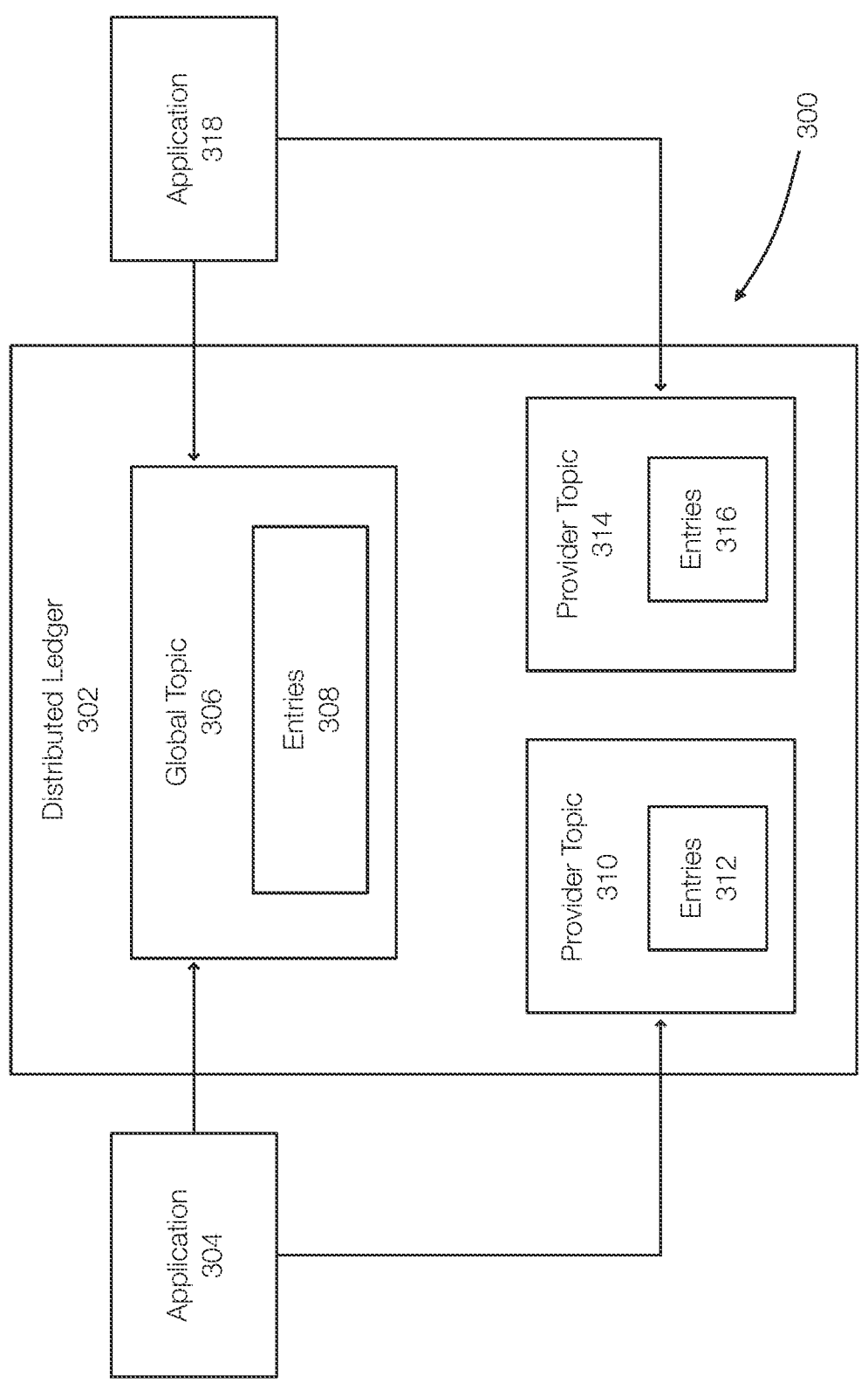
FIG. 3 discloses aspects of a distributed ledger that includes a global topic and provider specific topics.

FIG. 3 discloses aspects of a distributed ledger that includes a global topic and provider topics. The distributed ledger 302 includes a global topic 306 that includes entries 308. In one example, each of the entries 308 associates a trust provider with one or more identifiers such as a provider topic identifier, a smart contract identifier, or the like.

The distributed ledger 302 also includes a provider topic for each of the providers included in the entries 308. The provider topics in the distributed ledger 302 are represented by the provider topics 310 and 314. In this example, the provider topic 310 is associated with entries 312 and the provider topic 314 is associated with entries 316.

When joining or accessing a DCF, the application 304 (or client or other user) is given or is aware of a global identifier for the global topic 306. This allows the application 304 to access the global topic and search for or access information (e.g., topic identifiers, smart contract identifiers) of a specific trust provider. The query may specify a trust provider and the distributed ledger returns the trust providers information, such as topic identifiers and smart contract identifiers. The trust provider may be specified or searched in another manner. Once the application 304 has the topic identifier and/or smart contract identifier of a specific trust provider, annotations of data generated or associated with the application 304 can be written to the distributed ledger 302 using those identifiers or, more specifically, to the relevant provider topic. The application 318 operates in a similar manner.

This configuration of the distributed ledger 302 allows identifiers, such as provider topic identifiers and smart contract identifiers, to be distributed to applications. Thus, the global topic 306 is publicly accessible and has a universal identifier that is known by all applications, clients, users or the like.

In one example, the global identifier of the global topic 306 allows the DCF and applications using or accessing the DCF to operate without manual intervention. An application can query the global topic 306 and a particular identifier/identifiers is/are returned. The provider specific topic identifier returned in response to the query to the global topic 306 may be used to perform DCF operations such as writing annotations to the distributed ledger 302, providing payment as a service, or the like.

Figure 4:
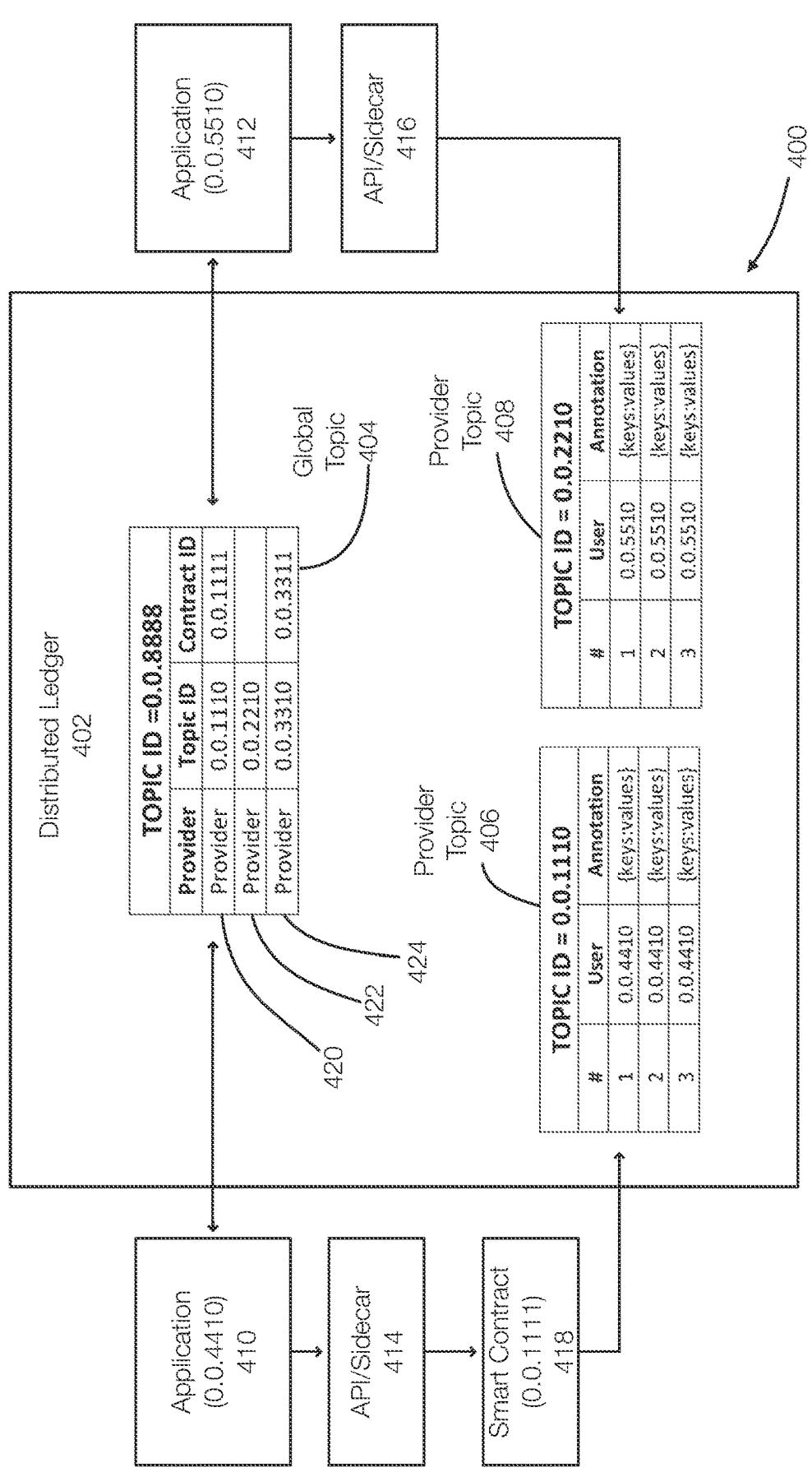
FIG. 4 discloses additional aspects of global topics and provider specific topics in a distributed ledger.

FIG. 4 discloses additional aspects of global topics and provider topics in a distributed ledger. FIG. 4 illustrates a distributed ledger 402, which may be part of or which is associated with a DCF 400. The distributed ledger 402 includes a global topic 404, which is publicly available and widely known in one embodiment. The distributed ledger 402 also includes provider topics 406 and 408.

The entries in the global topic 404 includes, by way of example, identifiers for each of providers 420, 422, and 424. The provider topic 406 (whose identifier is 0.0.1110) is associated with the provider 420 in the providers listed or stored in the global topic 404. The values associated with the provider 420 include a topic identifier and a smart contract identifier. The provider topic 408 (whose identifier is 0.0.2210) is associated with the provider 422 in the global topic 404. In this example, the provider 422 is not associated with a smart contract identifier.

The entries in the provider topic 406 include transactions or annotations. For example, the #1 entry in the provider topic 406 indicates that user 0.0.4410, which is the application 410, wrote annotations to the provider topic 406. Similarly, the application 412 writes annotations to the provider topic 408.

In this example, the provider 420 is associated with a smart contract identifier of 0.0.1111. When the application 410 writes or publishes annotations to the distributed ledger 402, the application 410 may use an API 414 to invoke a smart contract 418 (whose identifier is 0.0.1111). The smart contract 418 then publishes or writes the annotations to the provider topic 406 in the distributed ledger 402. The smart contract 418 may also invoke a payment as a service such that the trust provider 420 is paid for use of their trust function or trust insertion technology.

Alternatively, if the application 410 is a container, a sidecar 414 may be provided that is configured to access the DCF (e.g., for DCF operations such as writing to the distributed ledger 402) on behalf of the application 410.

FIG. 4 further illustrates an application 412 (whose identifier is 0.0.5510). FIG. 4 illustrates that the application 412 wrote annotations to the provider topic 408. Each entry in the provider topic 408 associates a user (e.g., the application 412) with the annotations (or other transaction). In this example, the provider 422 is not associated with a smart contract identifier in the global topic 404. As a result, the application 412 may write or publish annotations directly to the provider topic 408 in the distributed ledger 402 using the API or a sidecar 416.

The global topic 404 may include other information. For example, the global topic 404 may include or identify trust functions provided by the trust providers, standard or trust function fees charged by the trust provider, or the like. The table or entries in the global topic 404 may be arranged in a hierarchical structure, e.g., based on the amount of information saved in the global topic 404.

The trust provider may change their topic identifier and/or their smart contract identifier and/or other information. To prevent manual intervention and automatic reconfiguration of the applications, the information of the trust providers may be timestamped. This allows an application to use the most recent information available in the global topic 404.

More specifically, a trust provider may delete an existing smart contract by calling a self-destruct function and then instantiate a new or updated smart contract. Alternatively, the existing smart contract is disabled or execution of the existing smart contract is prevented. In this example, the trust provider may write or add a new entry to the global topic 404 with the new smart contract identifier. If the application 410 attempts to write annotations using the older smart contract identifier, the write fails as the smart contract does not exist. The application 410 may then perform a configuration operation (or a reconfiguration operation) to obtain and use the latest information written in the global topic 404 by the trust provider.

For topic identifiers, a trust provider may want applications to write annotations to a new topic. In this example, the trust provider may create a new topic and add an entry to the global topic 404. Because the distributed ledger 402 is typically immutable, the older topic identifier cannot be removed by the trust provider. However, the trust provider can restrict write access to the older topic, which essentially disallows applications from writing to the old topic.

When the application 410 attempts to write to the old or restricted topic, the call fails and the application (or a client or sidecar) can perform a configuration or reconfiguration operation and obtain and use the latest information in the global topic 404 written by the trust provider.

The global topic 404 enables that trust provider information can be accessed and distributed to applications in an automated manner. Embodiments of the invention further ensure that applications and clients can reconfigure themselves without human intervention and continue the execution of DCF related operations.

Figure 5:
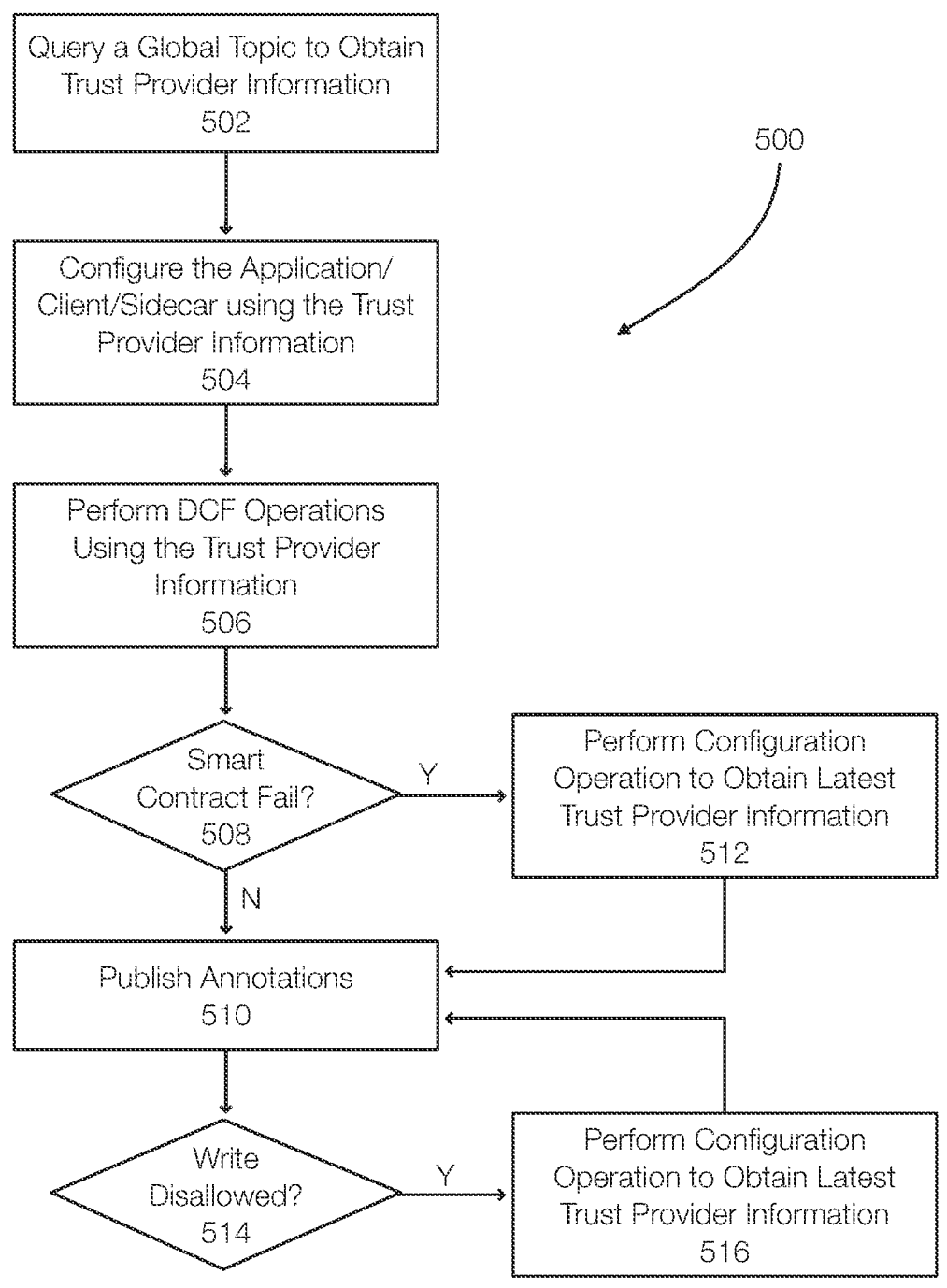
FIG. 5 discloses aspects of distributing provider specific topic identifiers in the context of writing to a distributed ledger.

FIG. 5 discloses aspects of a method for distributing identifiers to entities (applications, users, clients, sidecars) that join or use or are part of a DCF. The method 500 includes receiving 502 a query to a global topic to obtain trust provider information. For example, an application may query the global topic for the topic identifier and smart contract identifier of a particular trust provider.

The identifiers from the global topic are received and the application (or other requesting entity) is configured 504. For example, the identifiers are stored for use during particular DCF operations. The identifiers are used, for example, when writing/reading a provider topic in the distributed ledger.

Once the trust providers information (the identifiers) is obtained, DCF operations are performed 506. For example, annotations may be published to a provider topic.

If the identifiers include a smart contract identifier and an attempt to invoke a smart contract fails (Y at 508), a configuration is obtained to obtain 512 the latest trust provider information. The configuration operation may include performing a query to the global topic to obtain the latest trust provider information. The latest trust provider information can be obtained based on timestamps.

Once the new smart contract identifier is obtained, the annotations are published 510. If the write operation to the distributed ledger fails or is disallowed, the configuration operation may be repeated if necessary. For example, a trust provider may change only the smart contract identifier. Generally, performing the configuration operation will prevent the write from being disallowed.

In the event that the trust provider does not have a smart contract identifier, steps or acts 508 and 512 are omitted. The configuration operation is performed 516 when the write operation to the distributed ledger is disallowed (Y at 514). Thus, the global topic allows an application to automatically recover from a failed attempt to publish annotations without user intervention.

Figure 6:
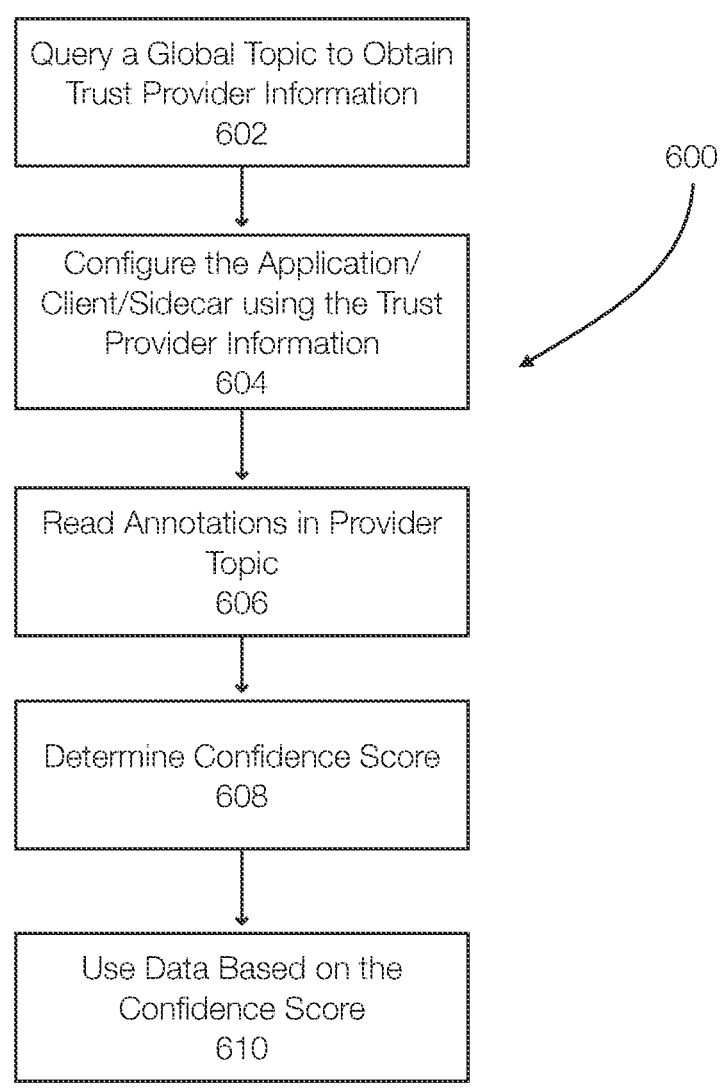
FIG. 6 discloses additional aspects of distributing provider topic identifiers in the context of reading a distributed ledger.

FIG. 6 discloses aspects of distributing identifiers in the context of determining confidence scores. The method 600 includes receiving 602 a query to a global topic to obtain information related to a trust provider. When the identifiers of the trust provider are obtained from the global topic, the application may be configured with this information.

When an application is consuming data, the application may read 606 annotations in the provider topic using the topic identifier returned by the global topic in the distributed ledger. A confidence score may be determined 608 from the annotations (or may be included in the annotations). The data may be used 610 based on the confidence score.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, DCF related operations, configuration operations, publishing operations, identifier distribution operations, topic related operations, or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to service read, write, delete, backup, restore, and/or cloning operations initiated by one or more clients or other elements of the operating environment.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure®, Amazon AWS®, Dell EMC® Cloud Storage Services, and Google Cloud®. More generally, however, the scope of the invention is not limited to employment of any particular type or implementation of cloud computing environment.

In addition to the cloud environment, the operating environment may also include one or more clients, applications, or systems, that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

Example embodiments of the invention are applicable to any system capable of storing and handling various types of data of objects, in analog, digital, or other form. Rather, such principles are equally applicable to any object capable of representing information.

It is noted that any operation(s) of any of these methods disclosed herein may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: returning, to a requestor, at least one identifier associated with a trust provider in response to receiving a query at a distributed ledger, wherein the query is directed to a global topic that includes information about trust providers that provide trust functions in a data confidence fabric, configuring the requestor to use the at least one identifier, the at least one identifier including a topic identifier to a provider topic in the distributed ledger associated with the trust provider, and writing annotations to the provider topic distributed ledger included in the data confidence fabric using the topic identifier.

Embodiment 2. The method of embodiment 1, wherein the requestor is an application, a client, or a sidecar.

Embodiment 3. The method of embodiment 1 and/or 2, further comprising querying the global topic, wherein the at least one identifier includes one or more of the topical identifier and a smart contract identifier, wherein the information about the trust providers includes a list, for each of the trust providers, of trust functions provided by each of the trust providers and fees charged by the trust providers.

Embodiment 4. The method of embodiment 1, 2, and/or 3, further comprising performing a configuration operation when writing the annotations is disallowed, wherein the configuration operation includes querying the global topic to obtain most recent information of the trust provider.

Embodiment 5. The method of embodiment 1, 2, 3, and/or 4, wherein the at least one identifier includes a smart contract identifier, further comprising performing a configuration operation when the smart contract fails to execute, wherein the configuration operation includes querying the global topic to obtain most recent information of the trust provider.

Embodiment 6. The method of embodiment 1, 2, 3, 4, and/or 5, further comprising updating the global topic, by the trust provider, with updated information, wherein the updated information is timestamped such that the requestor can identify the updated information as most recent information of the trust provider.

Embodiment 7. The method of embodiment 1, 2, 3, 4, 5, and/or 6, wherein updating the global topic includes providing a new smart contract identifier associated with a new smart contract, wherein the new smart contract identifier is added to the global topic and wherein execution of the smart contract is prevented.

Embodiment 8. The method of embodiment 1, 2, 3, 4, 5, 6, and/or 7, wherein updating the global topic includes providing a new topic identifier to a second provider topic to the global topic and disallowing writes to the provider topic.

Embodiment 9. The method of embodiment 1, 2, 3, 4, 5, 6, 7, and/or 8, further comprising reading annotations associated with data from the provider topic.

Embodiment 10. The method of embodiment 1, 2, 3, 4, 5, 6, 7, 8, and/or 9, further comprising determining a confidence score for the data based on the annotations read from the provider topic.

Embodiment 11. A method operable to perform any of the operations, methods, or processes, or any portion of any of these, disclosed herein.

Embodiment 12. A system, comprising hardware and/or software, operable to perform any of the operations, methods, or processes, or any portion of any of these, disclosed herein.

Embodiment 13. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or client may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
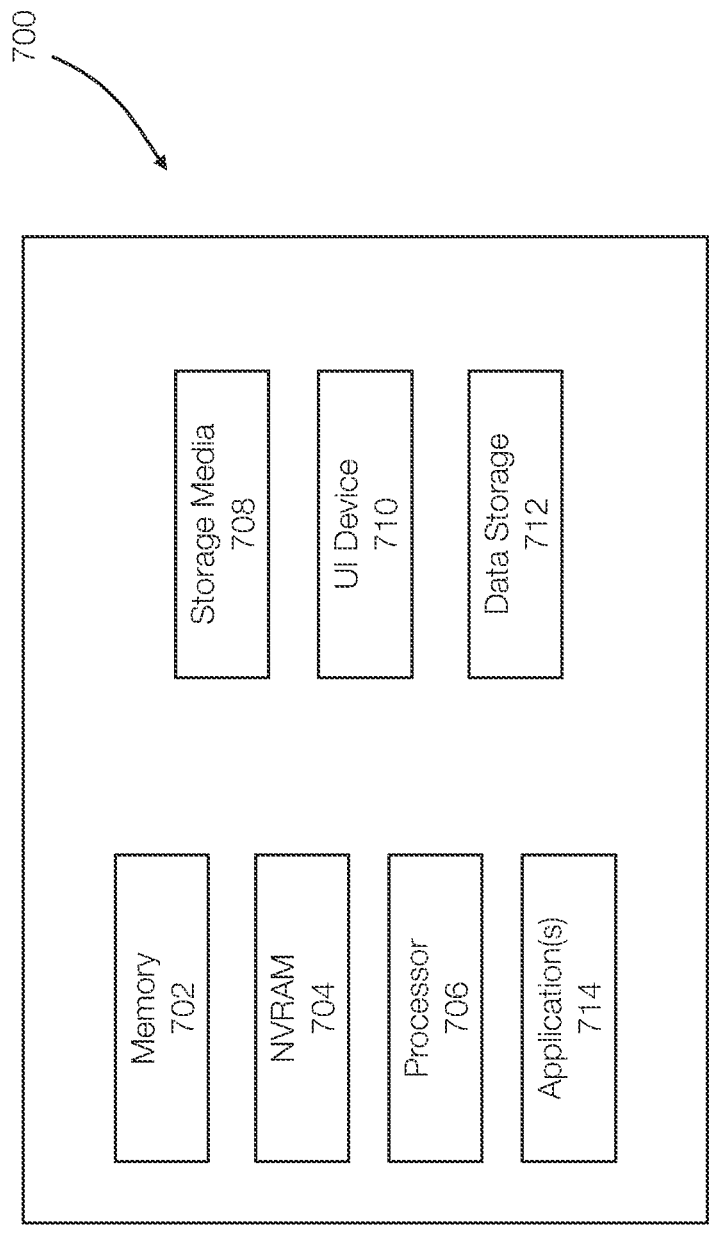
FIG. 7 discloses aspects of a computing device, system, or entity.

With reference briefly now to FIG. 7, any one or more of the entities disclosed, or implied, by the Figures, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

querying a global topic to obtain at least one identifier with a query at a distributed ledger, wherein the at least one identifier includes one or more of a topic identifier and a smart contract identifier associated with a smart contract, wherein the global topic includes information about trust providers that provide trust functions in a data confidence fabric, wherein the information about the trust providers includes a list, for each of the trust providers, of trust functions provided by each of the trust providers and fees charged by the trust providers;

returning, to a requestor, the at least one identifier associated with a trust provider in response to receiving the query at the distributed ledger;

configuring the requestor to use the at least one identifier, the at least one identifier including the topic identifier to a provider topic in the distributed ledger associated with the trust provider; and writing annotations to the provider topic in the distributed ledger included in the data confidence fabric using the topic identifier.

2. The method of claim 1, wherein the requestor is an application, a client, or a sidecar.

3. The method of claim 1, further comprising performing a configuration operation when writing the annotations is disallowed, wherein the configuration operation includes querying the global topic to obtain most recent information of the trust provider.

4. The method of claim 1, wherein the at least one identifier includes the smart contract identifier, further comprising performing a configuration operation when the smart contract fails to execute, wherein the configuration operation includes querying the global topic to obtain most recent information of the trust provider.

5. The method of claim 1, further comprising updating the global topic, by the trust provider, with updated information, wherein the updated information is timestamped such that the requestor can identify the updated information as most recent information of the trust provider.

6. The method of claim 5, wherein updating the global topic includes providing a new smart contract identifier associated with a new smart contract, wherein the new smart contract identifier is added to the global topic and wherein execution of the smart contract is prevented.

7. The method of claim 5, wherein updating the global topic includes providing a new topic identifier to a second provider topic to the global topic and disallowing writes to the provider topic.

8. The method of claim 1, further comprising reading the annotations associated with data from the provider topic.

9. The method of claim 8, further comprising determining a confidence score for the data based on the annotations read from the provider topic.

10. A non-transitory storage medium having stored therein instructions that are executable by one or more hardware processors to perform operations comprising:

querying a global topic to obtain at least one identifier with a query at a distributed ledger, wherein the at least one identifier includes one or more of a topic identifier and a smart contract identifier associated with a smart contract, wherein the global topic includes information about trust providers that provide trust functions in a data confidence fabric, wherein the information about the trust providers includes a list, for each of the trust providers, of trust functions provided by each of the trust providers and fees charged by the trust providers;

returning, to a requestor, the at least one identifier associated with a trust provider in response to receiving the query at the distributed ledger;

configuring the requestor to use the at least one identifier, the at least one identifier including the topic identifier to a provider topic in the distributed ledger associated with the trust provider; and writing annotations to the provider topic in the distributed ledger included in the data confidence fabric using the topic identifier.

11. The non-transitory storage medium of claim 10, wherein the requestor is an application, a client, or a sidecar.

12. The non-transitory storage medium of claim 10, further comprising performing a configuration operation when writing the annotations is disallowed, wherein the configuration operation includes querying the global topic to obtain most recent information of the trust provider.

13. The non-transitory storage medium of claim 10, wherein the at least one identifier includes the smart contract identifier, further comprising performing a configuration operation when the smart contract fails to execute, wherein the configuration operation includes querying the global topic to obtain most recent information of the trust provider.

14. The non-transitory storage medium of claim 10, further comprising updating the global topic, by the trust provider, with updated information, wherein the updated information is timestamped such that the requestor can identify the updated information as most recent information of the trust provider.

15. The non-transitory storage medium of claim 14, wherein updating the global topic includes providing a new smart contract identifier associated with a new smart contract, wherein the new smart contract identifier is added to the global topic and wherein execution of the smart contract is prevented.

16. The non-transitory storage medium of claim 14, wherein updating the global topic includes providing a new topic identifier to a second provider topic to the global topic and disallowing writes to the provider topic.

17. The non-transitory storage medium of claim 10, further comprising reading the annotations associated with data from the provider topic.

18. The non-transitory storage medium of claim 17, further comprising determining a confidence score for the data based on the annotations read from the provider topic.

* * * * *